United States Patent
Turton et al.

(10) Patent No.: US 11,218,302 B2
(45) Date of Patent: Jan. 4, 2022

(54) METHOD OF DATA TRANSMISSION

(71) Applicant: Airbus Defence and Space Limited, Stevenage (GB)

(72) Inventors: Brian Turton, Stevenage (GB); Martin Sharpe, Stevenage (GB)

(73) Assignee: AIRBUS DEFENCE AND SPACE LIMITED, Stevenage (GB)

(*) Notice: Subject to any disclaimer, the term of this patent is extended or adjusted under 35 U.S.C. 154(b) by 0 days.

(21) Appl. No.: 16/646,902

(22) PCT Filed: Sep. 11, 2018

(86) PCT No.: PCT/EP2018/074517
§ 371 (c)(1),
(2) Date: Mar. 12, 2020

(87) PCT Pub. No.: WO2019/053028
PCT Pub. Date: Mar. 21, 2019

(65) Prior Publication Data
US 2020/0295928 A1    Sep. 17, 2020

(30) Foreign Application Priority Data

Sep. 15, 2017 (GB) ..................... 1714844

(51) Int. Cl.
H04L 29/06    (2006.01)
H04L 9/08    (2006.01)
H04L 9/06    (2006.01)

(52) U.S. Cl.
CPC ............ H04L 9/0852 (2013.01); H04L 9/065 (2013.01)

(58) Field of Classification Search
CPC ..... H04L 9/0852; H04L 9/065; H04L 9/0855; H04L 9/0861; H04L 63/0428; G06F 21/72
See application file for complete search history.

(56) References Cited

U.S. PATENT DOCUMENTS 7,958,268 B2*  6/2011  Redlich ................. H04L 63/20
                                                    709/246
8,194,858 B2*  6/2012  Bukshpun ............ H04L 9/0838
                                                    380/277
(Continued)

FOREIGN PATENT DOCUMENTS

DE    102014207026 A1   10/2015
GB        2534918 A      8/2016

OTHER PUBLICATIONS

Guan Kyle et al., "Secrecey Capacities in Space-Division Multiplexed Fiber Optic Communication Systems," IEEE Transactions on Information Forensics and Security, vol. 10, No. 7, Jul. 1, 2015, pp. 1325-1335.

(Continued)

*Primary Examiner* — Hosuk Song
(74) *Attorney, Agent, or Firm* — Greer, Burns & Crain, Ltd.

(57) ABSTRACT

A method of data transmission, and more particularly a secure method of data transmission. The method comprises generating and sending a classical data stream and quantum data stream from a source to a destination. The step of generating and sending a classical data stream from the source to the destination comprises encrypting the data stream with the repeated use of a once-seen pad. Observing the quantum data stream received at the destination, may indicate eavesdropping and if so, the classical data stream is modified and sent from the source to the destination, including stopping the repeated use of the once-seen pad. The same once-seen pad may be used a number of times provided no third party has seen data encrypted by the once-seen pad.

18 Claims, 2 Drawing Sheets

(56) References Cited

U.S. PATENT DOCUMENTS

| | | | |
|---|---|---|---|
| 8,867,742 B2* | 10/2014 | Hirota | H04L 9/002 |
| | | | 380/256 |
| 9,042,546 B2* | 5/2015 | Jung | H04L 9/0861 |
| | | | 380/200 |
| 9,374,376 B2* | 6/2016 | Hunt | G06N 10/00 |
| 9,800,352 B2 | 10/2017 | Frohlich et al. | |
| 10,043,035 B2* | 8/2018 | LaFever | H04L 9/065 |
| 10,439,808 B2* | 10/2019 | Alleaume | H04L 9/0852 |
| 2005/0174563 A1 | 8/2005 | Evans et al. | |
| 2006/0256996 A1 | 11/2006 | Baeten | |
| 2012/0195428 A1 | 8/2012 | Wellbrock et al. | |
| 2016/0105439 A1 | 4/2016 | Hunt et al. | |
| 2016/0233964 A1 | 8/2016 | Frohlich et al. | |
| 2016/0337032 A1 | 11/2016 | Johnson et al. | |
| 2017/0026351 A1 | 1/2017 | Feller et al. | |
| 2017/0026354 A1 | 1/2017 | Reece et al. | |

OTHER PUBLICATIONS

Nicolas K. Fontaine, et al., "Continuously Tunable Optical Buffering at 40 GB/s for Optical Packet Switching Networks," Journal of Lightwave Technology, vol. 26, No. 23, Dec. 1, 2008, pp. 3776-3783.

J.F. Dynes et al., "Quantum Key Distribution Over Multicore Fiber," Optics Express, vol. 24, No. 8, Apr. 6, 2016, p. 8081.

* cited by examiner

METHOD OF DATA TRANSMISSION

CROSS-REFERENCES TO RELATED APPLICATIONS

This application claims the benefit of the International Application No. PCT/EP2018/074517, filed on Sep. 11, 2018, and of the United Kingdom patent application No. 1714844.6 filed on Sep. 15, 2017, the entire disclosures of which are incorporated herein by way of reference.

FIELD OF THE INVENTION

The present invention concerns a method of data transmission in a communications cable and detection of eavesdropping during such transmission.

BACKGROUND OF THE INVENTION

There is a need to secure optical fibers, for example undersea optical fiber cables or data center cables, against tapping. Various methods may be used to tap a cable including: fiber bending, optical splitting, evanescent coupling or similar coupling, v-groove cutting and/or scattering.

Traditionally, protection is provided against tapping by a number of means including: monitoring signals around the fiber, integral electrical conductors and capacitance measurement, multi-mode power monitoring, optical power monitoring, optical supervisory channels, optical time domain reflection monitoring, pilot tone monitoring, high bend/bend insensitive fibers (fibers designed to allow high bends) and encryption. The principles of cryptography are described in "Cryptography Engineering: Design Principles and Practical applications" 2010, John Wiley and Sons.

With the exception of encryption, the techniques tend to be difficult to accredit against a high threat level. However, strong accreditable encryption is hard to achieve at high data transfer rates (of the order of 100 Gbps or higher), and is expensive. There are presently no high-grade encryption protection techniques available at such high data rates, other than using traditional techniques in parallel for sending encrypted data, usually via IP on an Ethernet, and combining the output. The highest data rate commercial encryption devices tend to be based on Ethernet (Layer 2) encryption using 256 bit AES and are sometimes certified up to EAL 2+/FIPS 140-2 L3. Systems presently in development such as the AES256 layer 2 encryption system are potentially powerful but are not suitable for all applications due to the level of security required.

There remains a need for an improved method of secure data transfer at high data transfer speeds.

The present invention seeks to mitigate the above-mentioned problems. Alternatively or additionally, the present invention seeks to provide an improved method of data transmission, particularly at high speed.

SUMMARY OF THE INVENTION

According to a first aspect of the invention, there is provided a method of data transmission between a source and a destination, the method comprising the steps of: generating and sending a classical data stream from the source to the destination; generating and sending a quantum data stream from the source to the destination; whereby the classical data stream and quantum data stream are sent along the same communications cable at the same time; and observing the quantum data stream received at the destination, and if observation of the quantum data stream indicates eavesdropping, modifying the classical data stream and sending a modified classical data stream from the source to the destination.

The method of the invention provides a method of high-speed transmission of data which is secure, particularly in the event of eavesdropping or interference by a hostile party. The invention recognizes that modification (for example by traditional high-grade encryption necessitating a slower data transfer rate) is not required continuously on the full classical data stream, since for the majority of the time, the transmission is without eavesdropping or interference. By modifying the classical data stream only upon detection of data interception/eavesdropping on the communications cable, data can generally be sent "in-the-clear" or with a low level encoding, allowing a much faster transfer rate and a reduction in latency compared to what would be provided by say, typical high-grade encryption. The invention further recognizes that quantum techniques can be utilized to reliably and continuously observe a classical data stream and detect eavesdropping or other interference in real-time. The invention further recognizes that after detection of eavesdropping, it is not necessary to completely abort the transmission, but rather the classical data stream can be modified so that transmission may continue using traditional encryption techniques. The invention provides, through the observing of the quantum data stream, that only a fractional portion of the high-speed transmission is lost in the event of eavesdropping, the fraction representing the time between commencing of eavesdropping and modification of the classical data stream. Preferably, the fractional portion lost is insufficient to reveal meaningful information.

The method of the invention advantageously is protocol agnostic, i.e., it does not require tailored protocols such as IPsec protocols, to add security robustness.

A preferred embodiment provides simultaneous transmission of classical and quantum data in single a communications cable, which, in the event of eavesdropping or interference, advantageously enables the precise part of the classical stream which has been accessed to be identified.

The source may be located in a data center. The source may house a transmission unit. The transmission unit may comprise an electrical-optical transducer, for example a light-emitting diode or laser diode for generating photons. The transmission unit may comprise a classical signal coder for applying a suitable line code to generate a classical data (i.e., bit) stream. The transmission unit may comprise a quantum signal coder for encoding photons in a quantum state to generate a quantum data (i.e., qubit) stream. The step of generating and sending the quantum data stream may comprise the step of applying a quantum detection protocol, for example BB84 or another discrete variable detection protocol, such as BB92 or E91. Alternatively, the quantum detection protocol may be a continuous variable protocol such as Silberhorn (2002) or Grangier (2003).

The destination may be located in a data center. The destination may house a receiving unit. The receiving unit may comprise an optical-electrical transducer, such as a PIN diode or avalanche diode photodetector. The receiving unit may comprise a digital signal processor. The receiving unit and transmission unit may be separate hardware. The receiving unit and transmission unit may be parts of the same hardware, for example co-located in a combined transceiver.

The communications cable may comprise an optical fiber cable, for example formed of a bundle of multi-mode optical fibers or single-mode optical fibers or another kind of specialized optical fiber, for example a kind suitable for sub-sea transmission. A preferred embodiment of the invention utilizes wave division multiplexing technology, enabling multiple data channels to be carried at the same time in a single optical fiber cable.

The communications cable may comprise another kind of cable, for example a waveguide. The communications cable may comprise external shielding. The communications cable may be laid underground or under water.

The communications cable may comprise a plurality of communication channels. The channels may include: a quantum detection channel for transmitting the quantum data stream to the destination; a user data channel for transmitting the classical data stream to the destination; a pad transfer channel.

The classical data stream may comprise photons used in the classical way (hereafter classical photons). The quantum data stream may comprise photons used with specific quantum mechanical properties (hereafter quantum photons). The step of observing the quantum data stream may comprise the step of applying a detection technique to measure and detect any change in the quantum states of the quantum photons. The detection technique may be single photon detection, for example, where a discrete variable protocol is used. The detection technique may be a coherent detection technique such as homodyne/heterodyne detection of quadratures, for example where a continuous variable protocol is used.

The quantum data stream may continue to be observed after eavesdropping is indicated, and the modification of the classical data stream may continue until the observation no longer indicates eavesdropping. In the example embodiment of the invention, the overall transmission is secured by the classical data stream being modified for the duration of any eavesdropping or other interference by a hostile party. Advantageously over methods of the prior art, there is no requirement for the transmission to stop entirely.

The step of modifying the classical data stream may comprise pausing the generation and sending of the classical data stream from the source to the destination. Pausing may include ceasing sending of the classical data stream, for example, for a few milli-seconds. Pausing the generation and sending of the classical data stream and/or sending a modified classical data stream may reduce risk of release of information to a hostile party. The step of sending a modified classical data stream may be followed, after a suitable period, by restarting ordinary transmission (i.e., sending a classical data stream without traditional high-grade encryption).

The method of data transmission may comprise, prior to the step of modifying the classical data stream, providing an indication from the destination to the source wherein upon that indication, pausing the generation and sending of the classical data stream from the source to the destination. The indication may be the absence of an expected signal. The method therefore may be fail-safe.

The step of modifying the classical data stream may comprise encrypting the classical data stream prior to the step of sending the modified classical data stream from the source to the destination. Therefore, after eavesdropping has been detected, the transmission may continue, but in a high-grade traditionally encrypted form.

The encryption of the classical data stream may comprise a higher-level encryption necessitating a lower transmission speed when sending the modified classical data stream from the source to the destination. Ordinarily, while there is no eavesdropping, the transmission may be at a higher speed, of the order of 100 Gbps or higher, because there is no high-grade traditional encryption (it is generally not possible to transmit a fully encrypted signal at such high speed). For example, the transmission speed may be as high as the cable design will allow. After eavesdropping, the transmission may be fully encrypted, and sent at a speed of around an order of magnitude lower, for example of the order of 10 Gbps.

The step of generating and sending a classical data stream from the source to the destination may comprise the additional steps of: when generating the classical data stream, encrypting at least part of the classical data stream using a buffer containing a cryptographic code, for example a basic cryptographic code, and, when receiving the classical data stream at the destination, decrypting the at least part of the classical data stream using an identical buffer. The transmission unit may comprise a buffer. The buffer may be configured to apply a relatively basic code to the classical data stream, for example an algorithm to scramble the data. The buffer may comprise any coder which provides that function, for example, an interleaver. The receiving unit may comprise a buffer which may be identical to the transmission unit buffer.

In an example embodiment of the invention, the buffer may be filled with true random or sufficiently pseudo-random digits. The buffer may comprise a "once-seen" pad. A "once seen" pad is a cryptographic pad which may be repeatedly used provided that the cryptographic pad has not been observed. The buffer may be used to code the transmission data by XOR algorithm. The present example embodiment recognizes that a "once-seen" pad may be used continuously while it has not been observed, to provide a sequence of truly random digits for XOR data coding. The buffer may be arranged to re-use the "once-seen" pad while no eavesdropping is detected.

In the example embodiment, the "once-seen" pad may be sent from the transmission unit to the receiving unit in the pad transfer channel prior to data transmission, so that the buffers contain the same basic cryptographic code.

The buffers may be ring buffers. Ring buffers may provide a way of encrypting data at a speed suitable for high-speed transmission. The example embodiment recognizes that the same "once-seen" pad may be used an indefinite number of times provided that no hostile party sees data that has been encrypted by the "once-seen" pad. The present invention takes advantage of the properties of the "once-seen" pad and utilizes the ability of the quantum data stream to indicate eavesdropping, to provide a secure, and high-speed method of transmitting data. If observation of the quantum data stream at the destination indicates that there has been eavesdropping on the communications channel, and therefore a hostile party may have seen at least part of the classical data stream encrypted with the "once-seen" pad in the buffer, the transmission of the classical data stream can be paused, and encrypted more heavily and transmitted albeit at a slower speed. During such slower transmission, the classical data stream may not pass through the ring buffer.

When observation of the quantum data stream indicates that the eavesdropping has stopped, a new "once-seen" pad may be generated, and transmitted from the source to the destination, such that both buffers are populated by the new "once-seen" pad. The transmission of data may then revert to the previous arrangement, whereby the classical data stream is generated and sent from the source to the destination, via the ring buffer, at high-speed. The "once-seen" pad may be refreshed on an ongoing basis, such that, for example, when a ring buffer is used, 10% of the ring buffer pad is refreshed for each cycle of the ring buffer.

The method of data transmission may comprise the step of sending a regular "OK" signal from the destination to the source, provided that observation of the quantum data stream indicates no eavesdropping is taking place. The "OK" signal may be any other positive feedback signal. The "OK" signal is preferably an authenticated "OK" signal. The "OK" signal may be sent at intervals appropriate to the accepted potential limited exposure of the data transmission, for example five milliseconds.

The method of data transmission may comprise the step of pausing the generating and sending of the classical data stream from the source to the destination in the event that the source does not receive the "OK" signal from the destination. In the present example embodiment, the "OK" signal provides a fail-safe mechanism whereby in the absence of a positive indication in the form of the "OK" signal, un-encrypted high-speed transmission is paused. Conversely, if an "OK" signal is provided, transmission continues. The method of data transmission may comprise the step of continuing the generating and sending of the classical data stream from the source to the destination upon receipt at the source of the "OK" signal from the destination. The generation and sending of a regular "OK", or "watchdog" signal, may mean that even in the event of the signal being completely intercepted, the generation and sending of the classical data stream will only continue for a fixed period of time before the absence of an "OK" signal causes data transmission to stop or be more heavily (i.e., traditionally) encrypted. The period at which the "OK" signal is sent may be less than the time taken for the classical data stream to go through a full cycle of the ring buffer. In such an example arrangement, if the classical data stream is intercepted or eavesdropped, there will be no two parts of the classical data stream that have been encoded in the same way. Therefore, the data that has been intercepted or eavesdropped should remain secure.

The step of generating and sending a classical data stream from the source to the destination may be at a first transmission wavelength, and the method may include the step of: providing an optical guard signal at a second transmission wavelength longer than the first transmission wavelength, and measuring at the destination the signal power differential.

Sending classical data at a first transmission wavelength may include sending classical data at dense wavelength division multiplexing (DWDM) wavelengths which are close to one another. The second transmission wavelength may then be longer than all of the DWDM wavelengths.

The step of generating and sending a classical data stream from the source to the destination may be at a first transmission wavelength, and the method may include the step of: providing two optical guard signals, one on either side of the first transmission wavelength, and measuring at the destination the signal power differential of the two optical guard signals.

The method may include the step of: detecting a change in the signal power differential.

The method may include the step of: detecting a change in the signal wavelength differential. A change in received signal power differential or signal wavelength differential may indicate low-level leaking of photons. Such a step may provide a secondary mechanism for detecting eavesdropping. Such a step may complement the primary method of eavesdropping detection, particularly providing additional security against low-level photon leakage of the order of less than 5% data transmission, for example 1% data transmission. It may be preferable to monitor the power differential between two optical guard signals than between a single guard signal and the main transmission stream.

According to a second aspect of the invention there is also provided a data transmission system comprising: a communications cable; a transmission unit configured to generate and send a classical and a quantum data stream at the same time in the communications cable; a receiving unit configured to receive the classical and quantum data streams from the transmission unit; whereby the receiving unit is configured to observe the received quantum data stream and provide an indication to the transmission unit upon observation that the quantum data stream indicates eavesdropping; whereby the transmission unit is configured to modify the classical data stream upon receipt of the indication from the receiving unit.

The indication may be the absence of an "OK" signal.

The transmission unit and the receiving unit may be combined in a transceiver.

According to a third aspect of the invention there is also provided a kit of parts for data transmission comprising: a communications cable; a transmission unit configured to generate and send at the same time, a classical and a quantum data stream in the communications cable; a receiving unit configured to receive the classical and quantum data streams from the transmission unit; whereby the receiving unit is configured to observe the received quantum data stream and provide an indication to the transmission unit upon observation that the quantum data stream indicates eavesdropping; whereby the transmission unit is configured to modify the classical data stream upon receipt of the indication from the receiving unit.

A system for transmission of data may comprise: a data source; a data destination; a communications cable linking the data source and data destination; the data source comprising a transmission unit, the transmission unit comprising a quantum signal generator and a classical signal generator and a buffer; the data destination comprising a receiving unit, the receiving unit comprising a quantum signal receiver and a classical signal receiver and a buffer; wherein the quantum signal generator is arranged to generate and send a quantum signal to the quantum signal receiver through the communications cable, and the classical signal generator is arranged to generate and send a classical signal to the classical signal receiver through the communications cable, and the quantum signal receiver is arranged to receive the quantum signal and assess whether the signal has been eavesdropped, and the transmission unit buffer is arranged to encrypt the data sent from the classical signal generator to the classical signal receiver, and the receiving unit buffer is arranged to decrypt the data sent from the classical signal generator to the classical signal receiver.

The communications cable may comprise a single optical fiber cable with a number of communication channels. The channels may include: a quantum detection channel, along which the quantum signal generator sends the quantum signal to the quantum signal receiver; a user data channel, along which the classical signal generator sends the classical signal to the classical signal receiver; a pad transfer channel, along which the transmission unit may send "once-seen" pad information to the receiving unit for populating the receiving unit buffer.

It will of course be appreciated that features described in relation to one aspect of the present invention may be incorporated into other aspects of the present invention. For example, the method of the invention may incorporate any of the features described with reference to the system of the invention and vice versa.

BRIEF DESCRIPTION OF THE DRAWINGS

An embodiment of the present invention will now be described by way of example only with reference to the accompanying schematic drawings of which.

DETAILED DESCRIPTION OF THE PREFERRED EMBODIMENTS

Primary Systems

Figure 1:
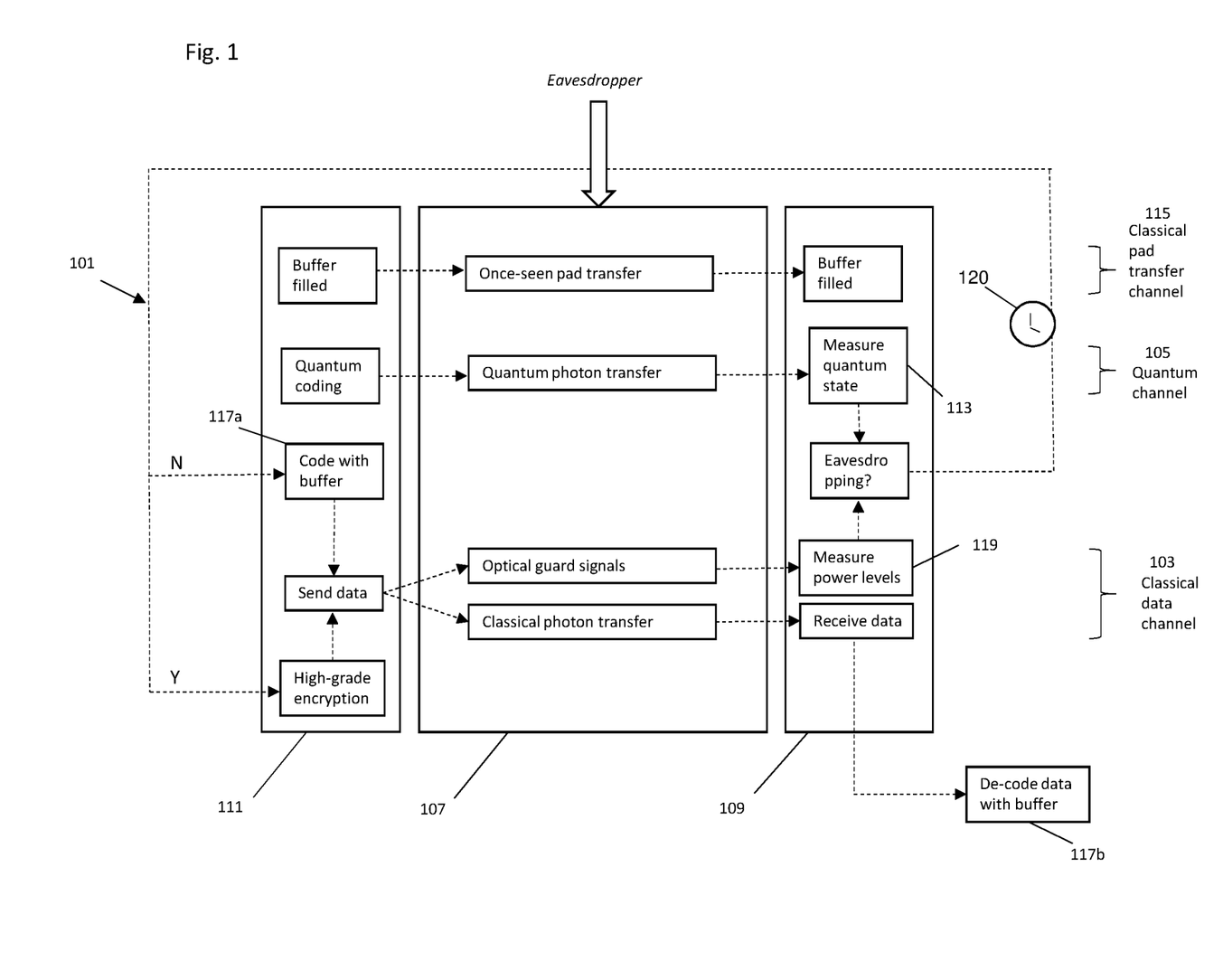
FIG. 1 is a block diagram of the example embodiment data transmission system.
Figure 2:
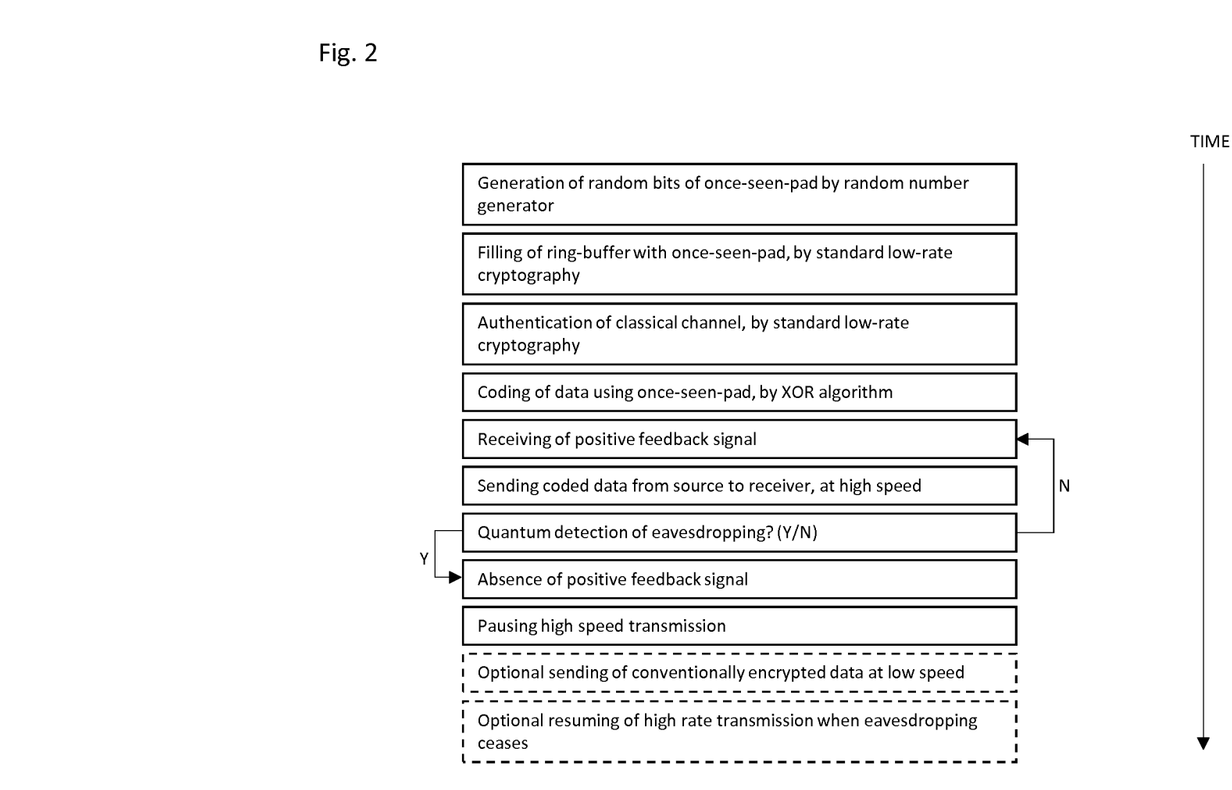
FIG. 2 is a flow diagram of a method of data transmission in the example embodiment system.

The example embodiment data transmission system 101 utilizes quantum eavesdropping techniques to secure a classical data stream transmission against potential eavesdropping (FIG. 1). The invention recognizes that in the absence of eavesdropping, a classical data stream may be transmitted securely without requiring high-grade encryption, providing a much faster transfer rate.

An optical fiber cable 107 extends between a transmission unit 111, such as a transmitter, and a receiving unit 109, such as a receiver, the units being associated with data centers. The optical fiber cable 107 houses a classical communications channel 103 through which a classical data stream is transmitted, a quantum channel 105 through which a quantum data stream is transmitted, and a classical pad transfer channel 120, through which coding information is transferred. Thus, the example embodiment system provides secure data transmission via a single cable.

A quantum detector 113 is housed within the receiving unit 109. The quantum detector 113 is a photon detector configured to apply principles of quantum eavesdropping detection (for example, the Heisenberg Uncertainty Principle and/or quantum entanglement) to detect a change in the quantum state of the quantum data stream and thus determine the presence or absence of eavesdropping or other such interference on the cable 107.

In the example embodiment, while no eavesdropping is detected, an authenticated "OK" signal is sent periodically from the receiving unit 109, to the transmission unit 111. A watchdog timer 120 coupled to the quantum detector 113 regulates the provision of the "OK" signal to the transmission unit 111. Receipt of the "OK" signal indicates to the transmission unit 111 the absence of eavesdropping, and that transmission may continue. The provision of the "OK" signal ensures that the sender fails safe (i.e., a positive indication is required in order for transmission to continue). On receipt of the "OK" signal, the transmission unit 111 continues to transmit. In the example embodiment the "OK" signal is authenticated, for example, using traditional cryptographic techniques. Such authentication may protect against a hostile party artificially generating an "OK" signal.

The example embodiment of the invention utilizes a "once-seen" pad. A "once-seen" pad is similar to a "one-time" pad of the kind used in quantum key distribution systems of the prior art, but unlike a "one-time" pad, may be used many times provided that it is not observed. The example embodiment of the invention recognizes that a watchdog timer 120 of suitable period in combination with quantum eavesdropping capability, enables the continuous use of the same "once-seen" pad (departing from previous applications of a one-time-pad) for coding data to be transmitted in-the-clear, or with a low level of encryption (i.e., without high-grade cryptography). Furthermore, transmission is stopped if eavesdropping is detected, before sufficient information is lost to allow reconstruction of part of the transmission.

While the watchdog timer 120 provides a positive indication to the transmission unit 111, transmission continues. If no positive indication is received, the transmission unit 111 ceases transmission and any detected bits of the "once-seen" pad are disposed of.

If eavesdropping is detected, the "OK" signal is blocked. In the absence of a received "OK" signal, transmission of the classical stream (but not the quantum stream) is halted at the transmission unit 111. The transmission is not discarded however, but retained and paused. This differs from typical quantum key distribution systems of the prior art, wherein a key is discarded in its entirety, if observed. The quantum stream continues and is used to monitor the eavesdropping, for example to detect if it ceases.

Additionally or alternatively, a specific alarm signal may be sent in the event of the detection of eavesdropping, causing the transmission of the classical data to be modified.

In the example embodiment, after detection of eavesdropping and the blocking of the "OK" signal, the system 101 switches to fully encrypted transmission, necessitating a slower transfer rate. Meanwhile, eavesdropping detection continues so that if eavesdropping ceases, after a suitable time period, an "OK" signal may be sent to re-start high-speed transmission.

In an alternative embodiment, there is no slow-rate encrypted transfer, and instead the system is programmed to wait until eavesdropping has ceased to resume transmission.

The invention thus advantageously enables user data to be transmitted securely at high-speed, for the majority of the time, while it is not being observed. By not using traditional high-grade encryption of user data, the device is easier, cheaper and quicker to accredit and construct, and allows for much faster data transfer which, for example, data centers require.

A further mechanism is required to prevent information being lost to a hostile party in the period between the start of eavesdropping and the ceasing of transmission. A secure and high speed mechanism is required to scramble the data, to ensure that any data revealed is insufficient to decode meaningful information.

The transmission unit 111 houses a ring buffer 117a filled with a secret "once-seen" pad comprised of truly random digits. A ring buffer, also known as a circular buffer, is a data structure and functions as a single buffer connected end-to-end. The ring buffer 117a is used to code the classical data stream by XOR algorithm prior to transmission. An identical ring buffer 117b housed in the receiving unit 109 is used to de-code the received data stream. XOR'ing data is a technique known in the art and not described further.

The "once-seen" pad is generated in the transmission unit 111, and sent from the transmission unit 111 to the receiving unit 109 in the pad transfer channel 115 prior to data transmission, so that the receiving unit buffer 117b may be filled with the correct digits. In the example embodiment, the ring-buffers 117a, 177b are filled with the "once-seen" pad using standard low speed cryptographic methods. Optionally, the classical data channel 103 is authenticated using the same standard low speed cryptographic method, to provide additional security against rogue connections.

The invention recognizes that a "once-seen" pad may be utilized continuously while it has not been observed and while it remains secret (though, of course, the same "once-seen" pad could not be used more than once). The "once-seen" pad must therefore be sufficiently long that it does not run-out before any eavesdropping is detected. If the system is run at 100 kbps for example, a determination of eavesdropping status is possible after approximately 100 bits have been transferred (i.e., after around 1 ms). Correspondingly, the ring buffer must be large enough to accommodate 100 bits. Similarly, on a 100 Gbps link, the ring buffer must be large enough for 100 Mb of data. The ring buffers 117a, 117b of the example embodiment are 10-100 Mb long. Upon eavesdropping, the "once-seen" pad bits that may have been seen must be disposed of, but in contrast to methods of the prior art such as those used in quantum key distribution, it is not necessary to discard the entire pad. The same "once-seen" pad may be used, provided that any observed bits have been disposed of. When observation of the quantum data stream indicates that eavesdropping has stopped, a new "once-seen" pad is generated, and transmitted from the source to the destination, such that both buffers 117a, 117b are populated by the new "once-seen" pad.

The ring buffer 117a provides basic coding at high speed (which cannot be provided by high grade cryptography), which is acceptable because the invention is intended for use in a multi-layered security application. For example, the cable 107 may be inaccessible and/or may be guarded in addition to utilizing a watchdog timer 120 to limit data loss.

Thus advantageously, the example embodiment system 101 is designed in such a way as to ensure that insufficient data is transmitted for any eavesdropper to reconstruct meaningful information for the brief period between when the eavesdropper starts listening and the ceasing of transmission.

The random bits of the "once-seen" pad are generated using a true random number generator, using conventional techniques, such as those described in "Quantum Random Number Generation for 1.25-GHz Quantum Key Distribution Systems"—2015, Journal of Lightwave Technology, 33, No 13, pp 2855-2859. Compensation via post-processing of the raw bit stream is required to ensure an equal probability of zeroes and ones (i.e., optimizing the statistical quality of the output sequence). This can be done to an arbitrary level of accuracy, at the expense of lowering the data rate.

Alternatively, a pseudo-random number generator may be used. A pseudo-random generator differs from a random number generator because complete knowledge of the generator structure and a previously generated sequence would enable prediction of a subsequent bit (unlike a truly random generator where the output is fully unpredictable). A pseudo-random generator may be sufficient for applications where only a flat statistic is needed, while a random number generator may be required for applications where sufficiently high unpredictability is a requirement (for example, in security applications).

In alternative embodiments of the invention, other techniques for utilizing a "once-seen" pad may be used. An alternative to the ring buffer host is, for example, filling up random-access-memory with data, and using the data a finite number of times, for example five times, before discarding the pad. Thus for example, at 100 Gbps, with 10% of the data used for encryption, the pad may be used 10 times before being discarded. Alternatively, a buffer may be used in a form other than a ring, and for example, a code may be used to determine the order of use. Prime numbers may be used to determine the bit intervals (hence avoiding repetition through the sequence).

In alternative embodiments of the invention, a "once-seen" pad is not used at all. Alternatives to using a "once-seen" pad include interleaving using forward error correction, or another algorithm such as discrete cosine transform to spread the data over a large number of bits. In another configuration, the random bits may be provided ahead of the data bits encrypted by those bits (at a cost of halving the user data rate). Those alternative methods are plausible but are not favored, because they may not be fast enough and may be harder to future-proof.

The present invention is suited to applications in which a fall-back is required for a high-speed link.

In the example embodiment, quantum photons are encoded at source (i.e., in the transmission unit 111) in discrete variables using the BB84 protocol. The quantum detector 113 housed in the receiving unit 109 measures the received quantum states and determines whether the quantum states have changed. If they have, that indicates that eavesdropping has occurred. The quantum channel 105 does not need to be secured, as no sensitive data is being sent via the quantum channel Instead, the signal is used to detect eavesdropping only.

In an alternative embodiment, the quantum photons are encoded via a continuous variable approach. The quantum information is encoded onto the amplitude and phase quadratures of a coherent laser, and can then be measured by the receiver using homodyne detectors. Examples of such protocols are Silberhorn (2002) and Grangier (2003).

Secondary Systems

The described embodiment of the invention may also be secured against low-level leakage of light. If only a few photons are observed by an eavesdropper, and the bending or similar process used to tap the data is not affecting the photons which are not tapped, then quantum detection may fail (i.e., a change in quantum state is not detected early enough), and eavesdropping could potentially continue undetected. A secondary system is required to detect low-level data leakage of the order of around 1%-5%.

In the example embodiment of the invention, two optical guard signals are provided, at wavelengths on either side of the user data transmission wavelength. Since different wavelengths leak to a different extent when eavesdropped via bends or similar techniques, eavesdropping can be detected by measuring a discrepancy in the received differential power level of the guard signals. A detector 119 housed in the receiving unit 109 monitors for a change in the differential power level. In an alternative embodiment, only a single guard signal is provided, and the differential power level is monitored between the guard signal and the transmission stream, however providing two guard signals is preferred. Alternatively, the wavelengths of the received guard signals could be measured via a loopback connection, with any change in optical path length indicating eavesdropping. In an alternative embodiment, a pseudo-random sequence could be placed on the transmitted signal and circulated back from the receiving unit 109 to the transmission unit 111. If the cycle has a known predefined period, any measured time delay could indicate eavesdropping on the transmission. The techniques described therefore provide secondary systems for detecting low-level leakage of data, and additionally may be used as back-up methods for detecting eavesdropping.

The system 101 may also be secured against an eavesdropper tapping the signal in a way which splits the classical bits from the quantum bits so that only the classical bits are observed (evading detection of eavesdropping). The example embodiment of the invention therefore utilizes, for the classical and quantum channels, DWDM frequencies which are close to one another. In addition, the quantum and the classical frequencies are switched randomly, preventing eavesdropping only on the classical channel An alternative embodiment of the invention may use course wavelength division multiplexing (CWDM).

While the present invention has been described and illustrated with reference to particular embodiments, it will be appreciated by those of ordinary skill in the art that the invention lends itself to many different variations not specifically illustrated herein. For example, in an alternative embodiment of the invention user data is transmitted at lower speeds. Such an embodiment of the invention may still enable a reduction in the costs associated with traditional encryption and a reduction in the complexities of key management.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of data transmission between a source and a destination, the method comprising the steps of:
   generating and sending a classical data stream from the source to the destination, wherein the step of generating and sending the classical data stream from the source to the destination comprises encrypting the data stream with the repeated use of a once-seen pad;
   generating and sending a quantum data stream from the source to the destination;
   whereby the classical data stream and the quantum data stream are sent along the same communications cable at the same time; and
   observing the quantum data stream received at the destination, and if observation of the quantum data stream indicates eavesdropping, modifying the classical data stream and sending a modified classical data stream from the source to the destination, including stopping the repeated use of the once-seen pad; and
   decrypting the classical data stream received at the destination with the repeated use of the once-seen pad.

2. The method of data transmission as claimed in claim 1, wherein the step of generating and sending the classical data stream from the source to the destination comprises encrypting at least part of the classical data stream using a buffer, the method further comprising the step of:
   when receiving the classical data stream at the destination, decrypting the at least part of the classical data stream using an identical buffer.

3. The method of data transmission as claimed in claim 2, wherein the buffers are ring buffers.

4. The method as claimed in claim 1, wherein the method comprises the step of refreshing the once-seen pad on an ongoing basis.

5. The method of data transmission as claimed in claim 1, wherein the quantum data stream continues to be observed after eavesdropping is indicated, and a modification of the classical data stream continues until the observation no longer indicates eavesdropping.

6. The method of data transmission as claimed in claim 1, wherein the step of modifying the classical data stream comprises pausing the generation and sending of the classical data stream from the source to the destination.

7. The method of data transmission as claimed in claim 6, wherein prior to the step of modifying the classical data stream:
   providing an indication from the destination to the source and subsequently pausing the generation and sending of the classical data stream from the source to the destination.

8. The method of data transmission as claimed in claim 1, wherein the step of modifying the classical data stream comprises encrypting the classical data stream prior to the step of sending the modified classical data stream from the source to the destination.

9. The method of data transmission as claimed in claim 8, wherein the encrypting of the classical data stream comprises a higher-level encryption necessitating a lower transmission speed when sending the modified classical data stream from the source to the destination.

10. The method of data transmission as claimed in claim 1, comprising the step of sending a regular "OK" signal from the destination to the source, provided that observation of the quantum data stream indicates no eavesdropping is taking place.

11. The method of data transmission as claimed in claim 6, comprising the step of sending a regular "OK" signal from the destination to the source, provided that observation of the quantum data stream indicates no eavesdropping is taking place, and comprising the step of pausing the generating and sending of the classical data stream from the source to the destination in the event that the source does not receive the "OK" signal from the destination.

12. The method of data transmission as claimed in claim 1, wherein the step of generating and sending the classical data stream from the source to the destination is at a first transmission wavelength, the method including the step of:
   providing an optical guard signal at a second transmission wavelength longer than the first transmission wavelength, and measuring at the destination a signal power differential.

13. The method of data transmission as claimed in claim 12, including the step of:
   detecting a change in the signal power differential.

14. A system for transmitting data between a source and a destination, comprising:
   means for generating and sending a classical data stream from the source to the destination, comprising encrypting the data stream with a repeated use of a once-seen pad;

means for generating and sending a quantum data stream from the source to the destination;

whereby the classical data stream and the quantum data stream are sent along the same communications cable at the same time; and means for observing the quantum data stream received at the destination, and if observation of the quantum data stream indicates eavesdropping, means for modifying the classical data stream and sending a modified classical data stream from the source to the destination, including stopping the repeated use of the once-seen pad; and means for decrypting the classical data stream received at the destination with the repeated use of the once-seen pad.

15. A data transmission system comprising:

a communications cable;

a transmitter configured to generate and send a classical and a quantum data stream at the same time in the communications cable, the transmitter further comprising a buffer including a once-seen pad, and configured to encrypt the classical data stream using repeated use of the once-seen pad;

a receiver configured to receive the classical and quantum data streams from the transmitter;

whereby the receiver is configured to observe the received quantum data stream and provide an indication to the transmitter upon observation that the quantum data stream indicates eavesdropping, the receiver further comprising a buffer including the once-seen pad, and configured to decrypt the classical data stream using repeated use of the once-seen pad;

whereby the transmitter is configured to modify the classical data stream upon receipt of the indication from the receiver including stopping of the encryption of the classical data stream using repeated use of the once-seen pad.

16. A data transmission system as claimed in claim 15 wherein the indication is an absence of an "OK" signal.

17. A data transmission system as claimed in claim 15 or 16 wherein the transmitter and the receiver are combined in a transceiver.

18. A kit of parts for data transmission comprising:

a communications cable;

a transmitter configured to generate and send at the same time, a classical and a quantum data stream in the communications cable the transmission unit further comprising a buffer including a once-seen pad, and configured to encrypt the classical data stream using repeated use of the once-seen pad;

a receiver configured to receive the classical and quantum data streams from the transmitter;

whereby the receiver is configured to observe the received quantum data stream and provide an indication to the transmitter upon observation that the quantum data stream indicates eavesdropping the receiver further comprising a buffer including the once-seen pad, and configured to decrypt the classical data stream using repeated use of the once-seen pad;

whereby the transmitter is configured to modify the classical data stream upon receipt of the indication from the receiver including stopping of the encryption of the classical data stream using repeated use of the once-seen pad.

* * * * *